US005983516A

United States Patent [19]

Trapp et al.

[11] Patent Number: 5,983,516

[45] Date of Patent: Nov. 16, 1999

[54] TWIN TOWER AIR DRYER SYSTEM WITH SHUTTLE MECHANISM

[75] Inventors: Scott M. Trapp, Charlotte, N.C.; Michael V. Kazakis, Simpsonville, S.C.

[73] Assignee: Westinghouse Air Brake Company, Wilmerding, Pa.

[21] Appl. No.: 09/206,710

[22] Filed: Dec. 7, 1998

Related U.S. Application Data

[62] Division of application No. 08/979,198, Nov. 26, 1997.

[51] Int. Cl.[6] ........ F26B 21/06

[52] U.S. Cl. ........ 34/80; 137/112

[58] Field of Search ........ 34/548, 557, 562, 34/565, 566, 80, 81, 82; 96/130, 133, 140, 141; 137/112, 627.5

[56] References Cited

U.S. PATENT DOCUMENTS

| | | | |
|---|---|---|---|
| 4,247,311 | 1/1981 | Seibert et al. | 96/111 |
| 4,525,183 | 6/1985 | Cordes et al. | 137/543.15 |
| 5,604,991 | 2/1997 | Castle et al. | 34/80 |
| 5,685,896 | 11/1997 | Castle et al. | 34/80 X |

*Primary Examiner*—Henry Bennett
*Assistant Examiner*—Steve Gravini
*Attorney, Agent, or Firm*—James Ray & Associates

[57] ABSTRACT

An air dryer includes two desiccant chambers, a control system and a cover member into which a shuttle valve mechanism has been incorporated. Secured atop the chambers, the cover member defines an outlet port, first and second passages, and a horizontal chamber between the passages in which a shuttle valve can be moved reciprocatingly. The horizontal chamber has two ends, a first interconnected to the first desiccant chamber by the first passage and a second interconnected to the second desiccant chamber by the second passage. The outlet port of the dryer extends from the horizontal chamber. Governing the flow of air into and out of the dryer, the control system periodically switches the incoming flow of untreated air between the two desiccant chambers. The control system thus determines which desiccant chamber will operate in a drying mode, with the other being operated in a purge mode. The desiccant chamber from which dried air is provided determines the end of the horizontal chamber to which the shuttle valve is moved. When moved to the second end, the shuttle valve opens the first passage to the outlet port. When moved to the first end, the shuttle valve opens the second passage to the outlet port. The shuttle valve defines a by-pass port that allows dried air from the drying chamber to be diverted to the purging chamber. This allows moisture collected in the purging chamber during the previous drying mode to be evaporated and expelled so as to regenerate the desiccant therein.

9 Claims, 4 Drawing Sheets

TWIN TOWER AIR DRYER SYSTEM WITH SHUTTLE MECHANISM

This application is a divisional application of U.S. application Ser. No. 08/979,198, filed Nov. 26, 1997.

CROSS REFERENCE TO RELATED APPLICATIONS

This application is a divisional application of U.S. application Ser. No. 08/979,198, filed Nov. 26, 1997.

The invention taught in this patent application is related to the subject matter taught in U.S. Pat. No. 5,423,129, entitled "Desiccant Cartridge Of An Air Dryer." This application is also related to U.S. Pat. Nos. 5,604,991 and 5,685,896, entitled "Switching and Purging Mechanism For A Twin Tower Air Dryer" and "Linear Choke Shuttle/Office Check Valve Mechanism For A Twin Tower Air Dryer," respectively, both filed Feb. 6, 1996. This application is also related to the following applications for patent, all having the same filing date as this application—Nov. 26, 1997: U.S. Ser. Nos. 08/978,796, 08/978,551, 08/979,197, and 08/979,649, entitled "E-1 Air Dryer Liquid Separator With Baffle," "Control Valve With Axial Sealing," "Purge Tube With Flapper Valve For Desiccant Containing Air Drier," and "E-1 Twin Tower Air Dryer For An Air Compressor Unit." These documents are assigned to the assignee of the invention described and claimed below, and their teachings are incorporated into this document by reference.

FIELD OF THE INVENTION

The present invention generally relates to a new and improved air cleaning and drying apparatus. More particularly, the present invention pertains to a new and improved shuttle valve mechanism for controlling the flow of compressed air from a twin tower compressed air cleaning and drying system which well balanced and preferably utilizes a relatively large, square reciprocating valve member incorporating a by-pass port and is self lubricating not requiring any scheduled maintenance.

BACKGROUND OF THE INVENTION

It will be appreciated that a Westinghouse Air Brake Company C-1 air dryer is designed to remove moisture from compressed air for use in a compressed air system as utilized on railway trains, transit vehicles and the like, as necessary to operate the air brake system and air valves. U.S. Pat. No. 5,423,129, assigned to the assignee of this invention and cited above, discloses such a system wherein the compressed air is cleaned and dried by passing it through a regenerating system containing a desiccant material to absorb the moisture and filter-out particulate matter. The desiccant is regenerated by passing a small percentage of the dried air back therethrough which absorbs at least some of the moisture collected in the desiccant and is therefore discarded.

In operation, the above noted prior art air drying system (now referred to as the "single tower" system) receives compressed air from a conventional air compressor, a supply which typically contains an unacceptably high amount of moisture and other particulates suspended therein. This unpurified compressed air is caused to flow upwardly through a desiccant material usually in the form of a porous cartridge containing a porous desiccant media. The desiccant plays the key role within the single tower air drying system in that it absorbs the moisture and traps various particulates (e.g., dust, dirt, etc.) as the compressed air moves upwardly through the desiccant media. Once moisture and particulates are extracted from the air stream, the cleaned and dried compressed air continues flowing from the desiccant media through a purge check valve situated near the top of the tower. This purified compressed air then passes through a side chamber, a part of which eventually reaches a purge volume.

When the air compressor is cycled off, the system operates in a purge mode. During the purge mode, the purified pressurized air contained within the purge volume passes slowly in the reverse direction through a choke in a purge check valve and then back through the desiccant media. This slow stream of dried air reabsorbs a portion of the moisture previously collected within the desiccant media. Having evaporated into this passing stream of dry air, the evaporated moisture eventually exhausts through the sump volume to atmosphere. This gradual purging of dry air back through the system serves to dry out and thus rejuvenate or regenerate the desiccant media. When the air compressor is again cycled on, the tower system returns to operation in a drying mode, with the desiccant media then again removing moisture from the stream of unpurified compressed air passing therethrough.

More recently, a twin tower system has been proposed and developed in which a pair of desiccant containing chambers or towers are provided, each alternating back and forth between operation in drying mode and in recycle mode. Accordingly, at any given moment of operation, one tower is operating in air drying cycle while the other is operating in recycle mode or purge cycle. A pair of control valves are provided to automatically switch the flow to reverse these flow directions so that after a defined time period the cycles are reversed so that in effect a continuous operation is achieved with each tower alternately operating in drying mode permitting moisture to collect within the desiccant media while the other tower is in recycle mode removing the collected moisture from the desiccant material or media. This unique system obviously had a greater moisture removing capability and also avoids the need to have the source of unpurified air cycled-off in order to purge the desiccant material of the moisture it has accumulated, and thereby eliminate the need to temporarily deprive the pneumatic system of a steady supply of clean and dried compressed air while the compressor is turned off.

In addition to the above advantages, the switching of the two drying assemblies alternately between the drying and the purging modes allows the twin tower system to exsiccate the air stream more efficiently than the prior art single tower system. Two desiccant towers rather than one are employed in the air drying system with one absorbing moisture while the other is being purged of it. The switching of the two drying assemblies alternately between the drying and the purging modes thus serves to continuously purge moisture from the twin tower system. More fully desiccated air is thus supplied to the pneumatic system. The amount, density and overall surface area of the desiccant can also be selected to suit varying needs.

The twin tower system can be applied to a wide variety of pneumatic systems. Typical of the types of pneumatic systems to which the twin tower system could be applied include the pneumatic brake systems of passenger and freight railroad trains, subway trains and various other types of rail related transportation systems. Further examples include the pneumatic brake systems of various truck transport vehicles. Other types of pneumatic systems to which the twin tower system could be applied may be found outside the transportation field.

Another disadvantage of the single tower air drying system is that it is only capable of removing a certain, limited amount of moisture during the purge mode. Because the volume of unpurified air flowing into the system to be dried vastly exceeds the volume of purified air used to purge the desiccant media, the desiccant media never adequately exsiccates during operation of the single tower system. Indeed, the desiccant media adequately exsiccates only after the system has been turned off for a prolonged time sufficient to accomplish same.

While the existing twin tower system is a marked improvement over the single tower system, some problems have been encountered, particularly in the complexity of the current check valve and shuttle mechanism utilized to regulate to flow of compressed air from the twin towers and to the twin towers for purge cycle. The apparatus as utilized in the prior art is not only difficult to manufacture and install, but also requires considerable attention and maintenance to keep it operating properly.

SUMMARY OF THE INVENTION

This invention is predicated upon our conception and development of an new and improved shuttle valve mechanism which is a marked improvement over that of that of the prior art. In a presently preferred embodiment of this invention the shuttle valve mechanism is in essence a low-velocity, short stroke, reciprocating shuttle valve preferably having square linear bearing surfaces within a squared shuttle chamber. The valve body defines a pair of side-by-side conical recesses to form an upper surface or end of the twin desiccant cavities on one side, with the squared shuttle chamber and associated ports on the other side. The squared or cubical nature of the shuttle valve is unique, and its size, in comparison to prior art shuttle valve systems, is relatively large which compliments its ease of installation and removal. The conical recesses forming the top of the desiccant cavities converge near the geometric center of the valve body to centralize the reciprocating shuttle valve when shifting from one side to the other, so that the performance of the system does not degrade when the shuttle valve is activated. Furthermore, the shuttle is self lubricating and has no dynamic seals. As a results, no scheduled maintenance is required throughout the life of the part.

In essence therefor, a presently preferred embodiment the shuttle valve mechanism of this invention comprises a generally rectangular body member adapted to be attached over the pair of desiccant containing chambers to form a closure thereover, and having a horizontally disposed rectangular chamber within the body member. A first passageway within the body member is provided to interconnect a first of the desiccant containing chambers with a first end of the rectangular chamber, while a second passageway within the body member interconnects a second of the desiccant containing chambers with a second end of the rectangular chamber. An outlet port is also provided within the body member extending outwardly from the rectangular chamber at a point intermediate between the afore-said first end thereof and the second end thereof. A reciprocating, rectangular valve member is disposed within the rectangular chamber adapted to open the first passageway to the outlet port when the valve member is disposed at the second end of the rectangular chamber, and adapted to open the second passageway to the outlet port when the valve member is disposed at the first end of the rectangular chamber. Pursuant to the above valving, cleaned and dried air is conveyed to the air system from which ever desiccant tower is functioning in the drying cycle or mode. In order to provide a reverse feed back for the desiccant purge cycle or mode, a by-pass port is provided through the faces of the rectangular valve member which is adapted to permit a small amount of compressed air to by-pass from the first passageway into the second passageway when the first passageway is open to the outlet port, and also to permit a small amount of compressed air to pass into the first passageway from said second passageway when the second passageway is open to the outlet port. As in the prior art system, a pair of control valve are also provided to regulate and alternate the flow of the compressed air to be dried into a first of the desiccant containing chambers and subsequently into the second. Accordingly, the reciprocating, rectangular valve is caused to reciprocate in response to the control valves; i.e., which ever one of the twin towers is receiving the flow of compressed air. Therefore, when a first of the control valves is directing the compressed air into the first of the desiccant chambers, the valve reciprocates away therefrom permitting the dried air passing through the first tower to enter the outlet port where it is conveyed to the compressed air system for use as intended. At the same time, a purge percentage of the dried air is by-passed to the second tower for effecting the desiccant purge cycle therein. Subsequently, when the timer reverses the flow so that the second control valve directs the compressed air into the second tower, the air flow is reversed so that the reciprocating valve is reversed to direct the cleaned and dried air to the compressed air system for use while by-passing a purge percentage back to the first tower to effect the desiccant purge cycle therein.

OBJECTS OF THE INVENTION

It is, therefore, a primary object of the present invention to provide a new, improved and greatly simplified shuttle valve mechanism for a twin tower air drying system which is a low-velocity, short stroke, reciprocating shuttle valve of a comparatively large size to compliment its ease of installation and removal.

Another object of this invention is to provide a new, improved and greatly simplified shuttle valve mechanism for a twin tower air drying system in which its moving components are centralized with its main recesses converging near the geometric center of the valve body to centralize the reciprocating shuttle valve when shifting from one side to the other, so that the performance of the system does not degrade when the shuttle valve is activated.

A further object of this invention is to provide a new, improved and greatly simplified shuttle valve mechanism for a twin tower air drying system in which no scheduled maintenance is required throughout the life of the part.

Still another object of this invention is to provide a new, improved and greatly simplified shuttle valve mechanism for a twin tower air drying system utilizing a squared reciprocating valve member within a squared chamber without any dynamic seals which is simple to manufacture and functions and does not degrade with continued use.

In addition to the objects and advantages of the present invention set forth above, various other objects and advantages will become more readily apparent to those persons skilled in the gas drying system art from the detailed description of the invention, particularly, when considered in conjunction with the attached drawings and with the appended claims.

DETAILED DESCRIPTION OF A PREFERRED EMBODIMENT OF THE INVENTION

Figure 1:
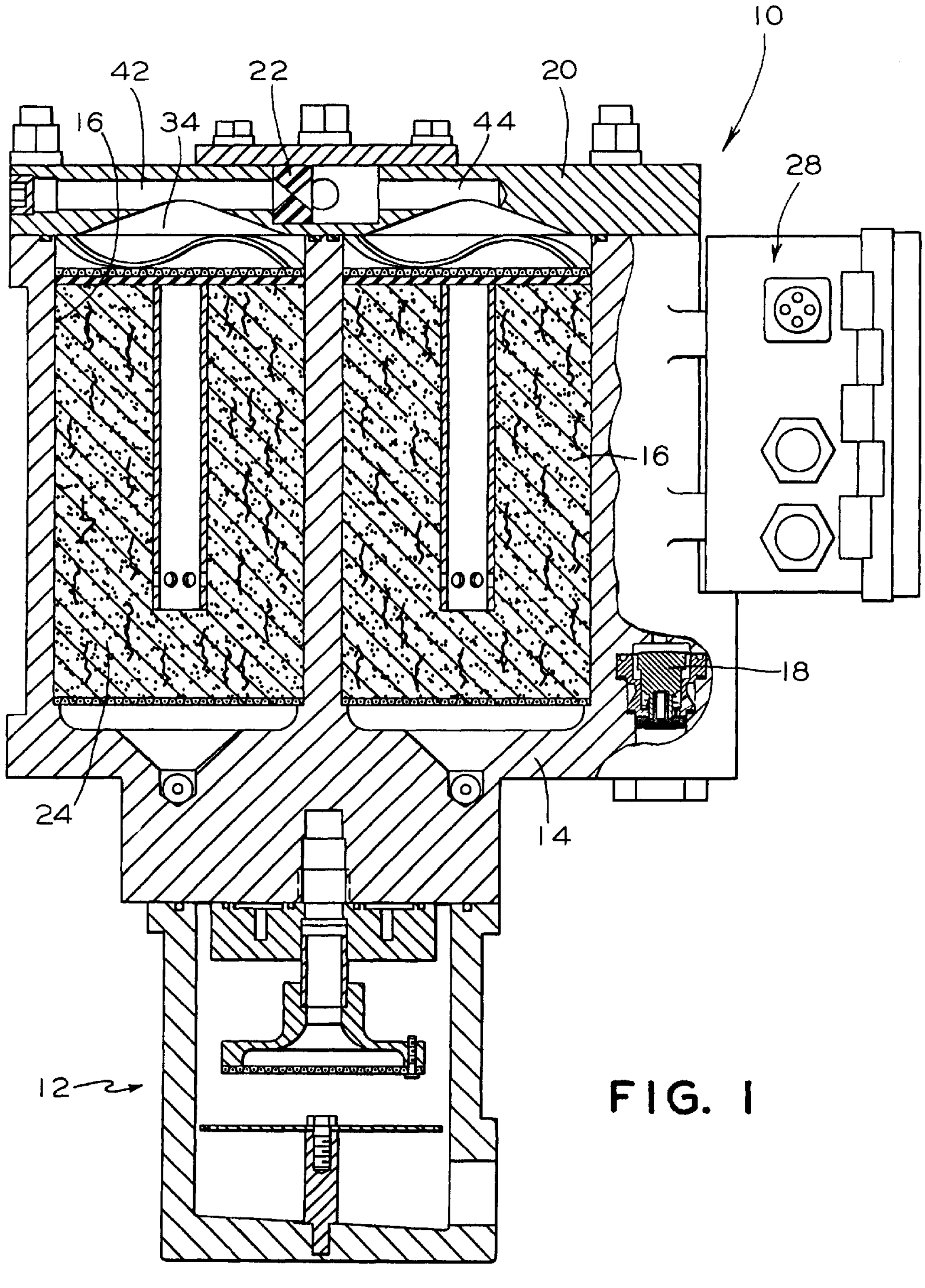
FIG. 1 is a partial schematic diagram of a twin tower air drying system in accordance with a presently preferred embodiment of this invention illustrating a side dimensional view thereof including a separating device, a control valve, two desiccant containing chambers and the shuttle valve mechanism in accordance with this invention.
Figure 2:
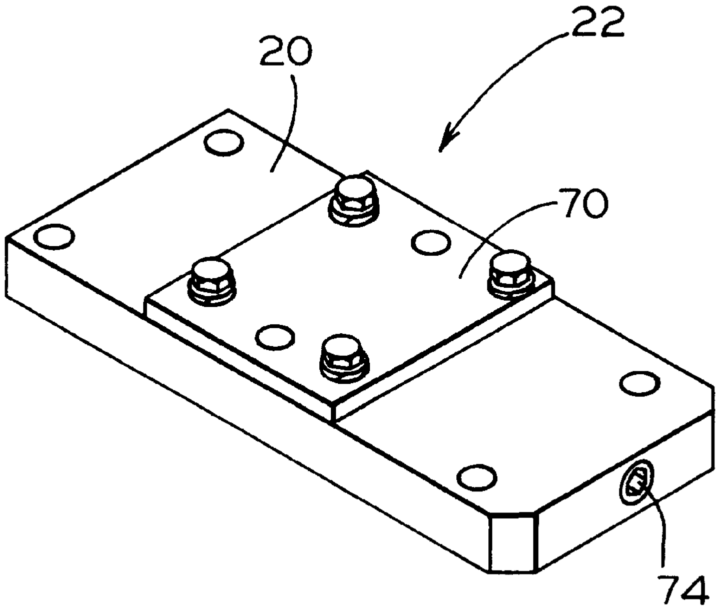
FIG. 2 is an isometric top view of the presently preferred embodiment of the inventive shuttle valve mechanism shown in FIG. 1 looking down onto the top surface thereof.

Before describing the present invention in detail, it is to be noted that for the sake of clarity and understanding, identical components having identical functions in each of the accompanying drawings have been marked with the same reference numerals throughout each of the several Figures illustrated herein.

FIG. 1 illustrates the essential details of a twin tower air drying system, generally designated 10. The twin tower system 10 cleans and dries a stream of unpurified pressurized air received from a source of compressed air, such as an air compressor (not shown) so as to supply a pneumatic system with purified compressed air. The unpurified air to be filtered and dried will typically contain the vapor of various substances as well as moisture in the form of water or other liquids such as various oils. For the sake of brevity, the terms vapor and moisture are herein collectively referred to as "moisture." The unpurified air will also typically contain other particulates such as dirt, dust, pollen and various other contaminants.

Referring first to FIG. 1, the twin tower air drying system 10 includes a separating means 12, such as a centrifugal water remover, a base housing member 14 containing a pair of chambers or towers 16, each having desiccant material therein, a pair of control valves 18 (only one is shown), and a cover member 20, containing the shuttle valve mechanism 22 of this invention. Described summarily, the twin tower air drying system 10 cleans and dries unpurified, moist air received from a source of pressurized air such as a conventional air compressor (not shown) to supply purified air to a pneumatic system (not shown). Typically, the compressed air is first passed through a water separator such as a centrifugal separator 12 where a large portion of the moisture is first removed mechanically from the compressed air before it is subjected to moisture removal by virtue of the desiccant. Through the function of the control valves 18, the unpurified, moist air from the separating means 12 is supplied alternately to the desiccant containing chambers 16 where it is filtered and further dried by virtue of passing the compressed air through a particulate desiccant media 24 contained within the two chambers 16.

While the desiccant media 24 can be loosely charged within the two chambers 16, it is preferably provided within a porous cartridge or fabric bag within which the desiccant media 24 is charged. The particulate desiccant media 24 is preferably contained within the porous cartridge or fabric bag completely filling same and of such size and configuration as to snugly fit within the chambers 16 to avoid any open spaces therearound through which air could pass without passing through the desiccant media 24. It should be understood that at any given moment of operation, the compressed, moist air is allowed to enter only one of the chambers 16 for the purpose of filtering the compressed air through the desiccant media 24 while the desiccant media 24 removes moisture from the compressed air moving upwardly therethrough. While the compressed, moist air is being filtered and dried in one of the two chambers 16, as described, the other of the two chambers 16 is operation in the purge cycle whereby a portion of the filtered and dried compressed air is allowed to pass in the reverse direction, downwardly through the desiccant media 24 within that other chamber 16 for the purpose of removing moisture from the desiccant media 24 within that chamber 16.

A timer control 28 is provided to intermittently operate the two control valves 18 such that one is opened to permit the flow of compressed, moist air upwardly through one of the chambers 16, and the desiccant media 24 therein, while the other of the two control valves 18 is closed to prevent such flow. At periodic intervals, the timer control 28 will close the valve 18 which was previously open and then open the valve 18 which was previously close, thereby changing the flow of compressed, moist air to the other chamber 16. Accordingly, the compressed, moist air is filtered and dried in a continuous operation whereby the flow is alternated back and forth between the two desiccant containing chambers 16. Obviously, an outlet means must be provided to permit egress of the purge air from the two chambers 16 while operating in the desiccant purge cycle. Ideally, this is accomplished with the control valve 18 which can be adapted to vent such purge air to atmosphere when it is closed to admitting moist air to the chamber 16 during the air drying cycle.

The subject invention is based on the unique shuttle valve mechanism 22 incorporated into the cover member 20, attached at the top of base housing member 14. The cover member 20, firstly serves to form a closure over the two chambers 16 to seal them from atmosphere. The unique shuttle valve mechanism 22 is firstly intended to distribute the filtered and dried compressed air emerging from the chamber 16 (i.e., that chamber 16 which is operating in the air filtering and drying cycle) in an output percentage to the pneumatic system for its intended use, and secondly intended to direct a purge percentage of that filtered and dried air back into the twin tower system 10, namely the other chamber 16 (i.e., that chamber 16 operating in the desiccant purge cycle). The purge percentage of the cleaned and dried air is used to purge the desiccant media 24 within that chambers 16 of moisture it has previously collected.

Figure 3:
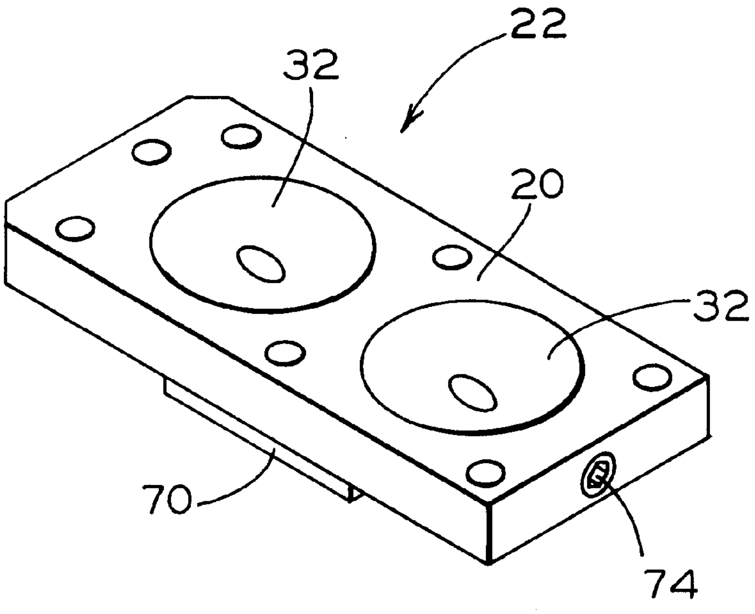
FIG. 3 is an isometric bottom view of the shuttle valve mechanism shown in FIG. 2 looking upwardly to the undersurface thereof.

With reference to FIGS. 2–5, the shuttle valve mechanism 22 comprises a generally rectangular cover member 20 adapted to be attached over the desiccant containing chambers 16 to form a closure thereover. As shown in FIG. 3, the underside of cover member 20 is provided with a pair of side-by-side conical recesses 32 machined into the undersurface, each sufficient to form an outlet chamber 34 (FIG. 1) over the respective chamber 16 thereunder. A rectangular chamber 40 is horizontally disposed within cover member 20 at the approximate center thereof, with a first passageway 42 within the cover member 20 interconnecting the apex of a first of the conical recesses 32 with a first end of the rectangular chamber 40, and a second passageway 44 within the cover member 20 interconnecting the apex of a second conical recess 32 with a second end of the rectangular chamber 40. Accordingly, one each of the desiccant containing chambers 16 is in communication with rectangular chamber 40 via one of the passageways 42 or 44. An outlet port 46 is also provided within the cover member 20 extending outwardly from the rectangular chamber 40 from a point intermediate the first and second ends thereof, namely intermediate the two passageways 42 and 44. The outlet port 46 is the primary outlet for the filtered and dried compressed air delivered from the cleaning and drying system to the compressed air system for use as intended thereby.

A rectangular valve member 48 is reciprocally disposed within the rectangular chamber 40 and intended for movement from one extreme end of chamber 40 to the other. Therefore, reciprocating valve member 48 is adapted to open the first passageway 42 (and accordingly a first of the chambers 16) to the outlet port 46 when the valve member 48 is disposed at the second end of the rectangular chamber 40, and conversely adapted to open the second passageway 44 (and accordingly the second of the chambers 16) to the outlet port 46 when the valve member 48 is disposed at the other or first end of the rectangular chamber 40. As should be apparent, the rectangular valve member 48 is adapted to reciprocate back and forth within rectangular chamber 40 in response to the pressure and flow of the air emerging from whichever chamber 16 is operating in the air drying cycle. Therefore, when the left chamber 16 is functioning in the air filtering and drying cycle, the air flow therethrough will force valve member 48 to the right, opening passageway 42 to passageway 46 to thereby deliver the filtered and dried air to the pneumatic system for use as intended. When the right chamber 16 becomes the chamber functioning in the air filtering and drying cycle, the change in air flow therethrough, will force the valve member 48 to the left, thereby closing passageway 42, and instead opening passageway 44 to passageway 46.

A by-pass port 50 is provided through the body of rectangular valve member 48 which is adapted to permit a limited amount of compressed air to pass into the chamber 16 which is not functioning in the air filtering and drying cycle; namely, to pass from the first passageway 42 into the second passageway 44 when the first passageway 42 is open to the outlet port 46; and which also serves the reverse situation, namely to permit a limited amount of compressed air to pass into the first passageway 42 from the second passageway 44 when the second passageway 44 is open to the outlet port 46. Accordingly, reciprocating valve member 48 will reciprocate back and forth within rectangular chamber 40 opening one passageway, either passageway 42 or 44, to the outlet port 46 to deliver the filtered and dried compressed air to the system in the output percentage for use as intended, while at the same time permitting a purge percentage the filtered and dried air to by-pass the rectangular valve 48 via by-pass port 50 to be directed into the other of the two chambers 16 for the purpose of effecting the purge cycle within that other chamber 16. Obviously, that purge percentage of the dried compressed air reversed through the desiccant media 24 in that chamber 16 will purge the moisture therefrom.

Figure 6:
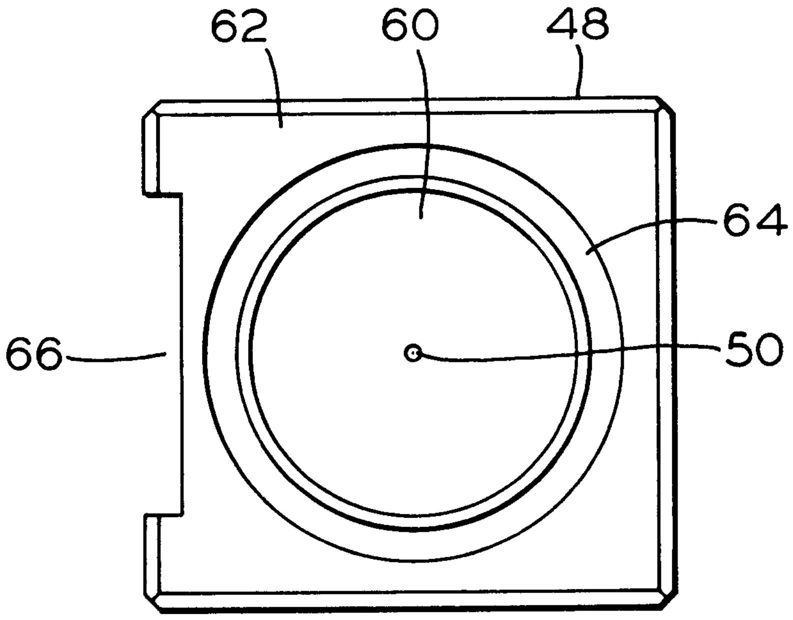
FIG. 6 is an elevational side view if the reciprocating shuttle valve utilized in the shuttle valve mechanism shown in FIGS. 1–5.
Figure 7:
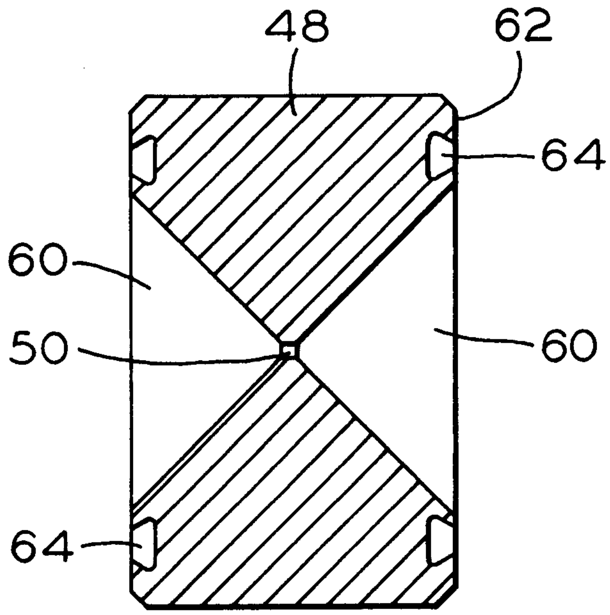
FIG. 7 is a cross-sectional top view of the reciprocating shuttle valve shown in FIG. 6.

Reference to FIGS. 6 and 7 will better illustrate the preferred details of the reciprocating valve member 48, where it can be seen to preferably have a square cross section with a conical recess 60 in each side face 62 thereof, with the by-pass port 50 interconnecting the apex of each conical recess 60. A circular channel 64 is provided in each face 62 encircling the two conical recesses 60, each adapted to receive and hold an O-ring seals (not shown). Accordingly, when reciprocating valve member 48 is forced to either of the extreme ends of rectangular chamber 40 to close the first or second passageway (either 42 or 44) one of the O-ring seals (not shown) will abut against the flat wall potion of rectangular chamber 40 to virtually seal that passageway (42 or 44) in the closed position, so that the only compressed air that can get therepast is the purge percentage allowed through the by-pass port 50.

As can further be seen, it is also preferable that reciprocating valve member 48 be provided with a cut-away slot portion 66 on the backside surface so that when valve member 48 is centered within rectangular chamber 40 it will not in fact seal closed outlet port 46, but will instead allow some limited passage of air from passageways 42 and 44 to outlet port 46. Specifically, during start-up when there is no pressure differential between the two chambers 16, the reciprocating valve member 48 tends to be centered within rectangular chamber 40, in essence sealing closed outlet port 46, and restricting flow from both chambers 16. Slot portion 66 will prevent this problem by allowing some compressed air to pass into outlet port 46 during initial start-up.

Figure 4:
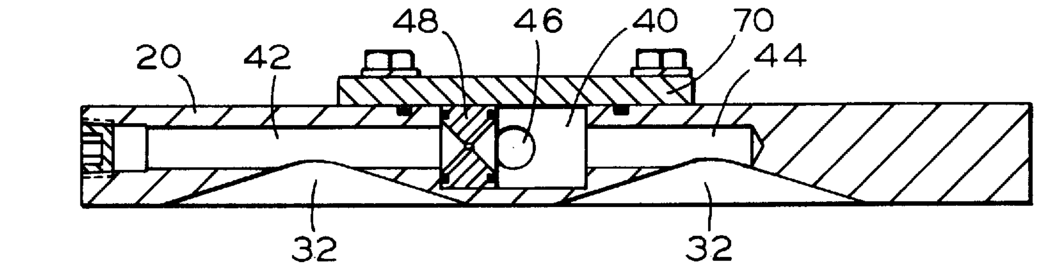
FIG. 4 is a cross-sectional side view of the shuttle valve mechanism shown in FIGS. 2 and 3.
Figure 5:
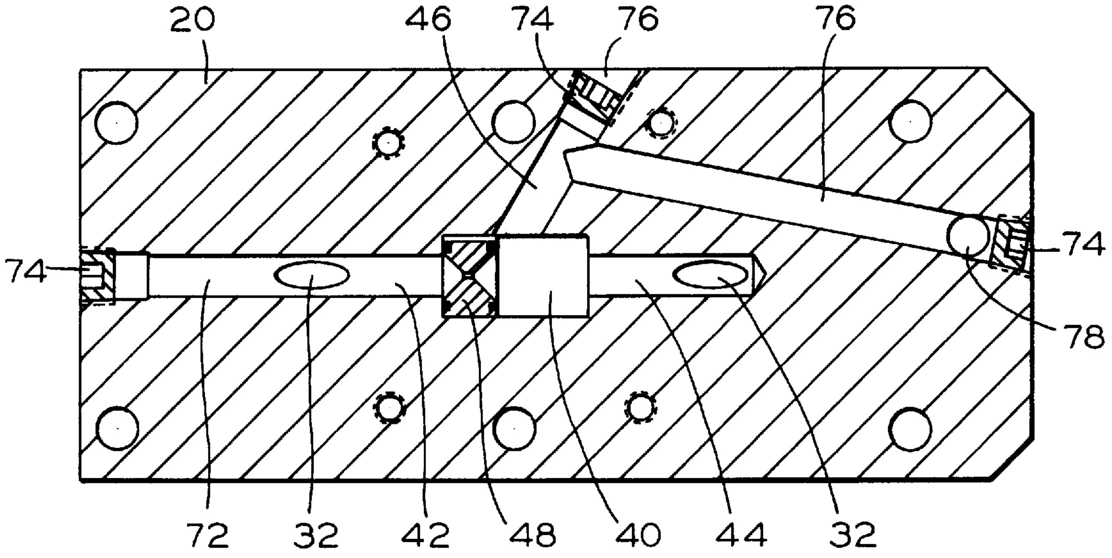
FIG. 5 is a cross-sectional top view of the shuttle valve mechanism shown in FIGS. 2–4.

While the rectangular chamber 40, as well as the passageways 42 and 44 can be formed in any way desired, it can be seen from FIGS. 4 and 5, that rectangular chamber 40 can be formed by machining the rectangular chamber 40 into the upper surface of rectangular body member 20, and then closing rectangular chamber 40 by bolting cover plate 70 thereover. Passageways 42 and 44, on the other hand are formed by drilling a straight port 72 laterally through the center of rectangular body member 20 and then closing-off the opening to port 72 with a cap-plugs 74 at the outer end. The accesses from conical recesses 32 to rectangular chamber 40, on the other hand are formed merely by drilling the straight port 72 as necessary to intersect the apexes of the two conical recesses 32. As can be seen in FIG. 3, the intersections of port 72 with the two apexes of conical recesses 32 will provide an oval aperture at each apex so that the compressed air can exit from chambers 34 to the respective passageways 42 and 44.

The outlet port 46 is formed substantially the same way by drilling one or more straight ports 76 from the side of rectangular chamber 40 to an outlet passage 78, through which the filtered and dried air is delivered to the pneumatic system. In the particular embodiment shown, two such intersecting straight ports 76 are necessary because outlet passage 78 is not properly aligned adjacent to a side of rectangular chamber 40. Of course, two cap plugs 74 are required to close the drilled inlets to the straight ports 76.

In operation, compressed air from a conventional compressor (not shown) is firstly routed through a centrifugal separator 12 wherein a significant amount of moisture is removed from the compressed air. From the centrifugal separator 12, the compressed air may be still rather moist and is routed past the two control valves 18, only one of which will be open to permit the moist compressed air to pass upwardly through one of the desiccant containing chambers 16 where the compressed air will be filtered and additional moisture will be removed. The upward flowing compressed air through a first of the chambers 16 (assuming it to be the left chamber 16) will of course pass into the outlet chamber 34 over that first (left) desiccant containing chamber 16, and into the first passageway 42 causing reciprocating valve member 48 to reciprocate away from that first passageway 42, closing passageway 44, so that most of the filtered and dried compressed air will exit via outlet port 46 and outlet passage 78 from which it is delivered to the pneumatic system for use as intended. A small purge percentage of the filtered and dried, compressed air, however, will by-pass the reciprocating valve member 48 entering through the by-pass port 50, so that it will enter second passageway 44 and be conveyed downwardly through the other (i.e., right) chambers 16. As previously explained, this purge percentage of dried, compressed air will purge the moisture contained the desiccant in that chamber 16 (i.e., right chamber 16), and upon exiting from the bottom, the control valve 18 for that chamber 16 will vent the purge air to atmosphere.

After a preset period of time, the timer 28 will switch the open and closed positions of the two control valves 18, so that the moist, compressed air from the centrifugal separator 12 is switched-over to pass upwardly through the second of the two chambers 16 (i.e., the right chamber 16) where it is filtered and dried in this second (right) chambers 16. The upward flowing compressed air through the second (right) chambers 16 will of course pass into the outlet chamber 34 over that second desiccant containing chamber 16, and into the second passageway 44 causing reciprocating valve member 48 to reciprocate to the other end of chamber 40 away from that second passageway 44, thereby closing passageway 42, so that most of the dried, compressed air will exit through passageway 44 via outlet port 46 and outlet passage 78 from which it is delivered to the pneumatic system for use as intended. As before, a small purge percentage of the dried, compressed air, however, will by-pass the reciprocating valve member 48 entering through the by-pass port 50, so that it will enter first passageway 42 and conveyed downwardly through the first (i.e., left) chamber 16. This purge percentage of dried, compressed air will of course serve to purge the moisture contained the desiccant in that chamber 16, and upon exiting from the bottom, the control valve 18 for that chamber 16 will vent the purge air to atmosphere. Accordingly, the switching of reciprocating valve member 48 occurs automatically as the flow of compressed air is switched from one chamber 16 to the other.

Having disclosed one embodiment of the shuttle valve mechanism of this invention, it should be apparent that a number of different embodiments and modifications could be devised and incorporated without departing from the spirit of the invention. For example, the reciprocating valve member 48 could be provided in a number if different forms such as a sliding cylindrical form, or even a flapper type of valve adapted to pivot from one side to the other. In using a sliding valve, a number of different guide means could be provided to eliminate the tendency for twisting.

We claim:

1. A compressed air cleaning and drying system comprising:

a) a pair of desiccant containing chambers adapted to alternately function firstly in an air cleaning and drying cycle in which a moist air is passed through the desiccant whereby the air is filtered and at least a portion of any moisture is removed from the air, and secondly adapted to function in a desiccant purge cycle in which a portion of the dried air is passed back through the desiccant to absorb moisture therefrom thereby at least partially regenerating the desiccant;

b) valve means to pass compressed air from an air compressor into a first of said desiccant containing chambers and after a predetermined time to pass said compressed air from an air compressor into a second of said desiccant containing chambers;

c) a generally rectangular cover member adapted to be attached over said desiccant containing chambers to form a closure over each of said chambers;

d) a horizontally disposed rectangular chamber within said cover member;

e) a first passageway within said cover member interconnecting said first desiccant containing chamber with a first end of said rectangular chamber;

f) a second passageway within said cover member interconnecting said second desiccant containing chamber with a second end of said rectangular chamber;

g) an outlet port within said cover member extending outwardly from said rectangular chamber at a point intermediate said first end thereof and said second end thereof;

h) a rectangular valve member reciprocally disposed within said rectangular chamber adapted to open said first passageway to said outlet port when said valve member is disposed at said second end of said rectangular chamber, and adapted to open said second passageway to said outlet port when said valve member is disposed at said first end of said rectangular chamber; and i) by-pass port associated with said rectangular valve member adapted to permit a limited amount of compressed air to pass from said first passageway into said second passageway when said first passageway is open to said outlet port and to permit a limited amount of compressed air to pass into said first passageway from said second passageway when said second passageway is open to said outlet port.

2. A compressed air cleaning and drying system, according to claim 1, in which said rectangular chamber is generally centered within said rectangular cover member.

3. A compressed air cleaning and drying system, according to claim 1, in which an undersurface said rectangular cover member is provided with a pair of conical recesses, each adapted to form an upper closures over each of the desiccant containing chambers.

4. A compressed air cleaning and drying system, according to claim 3, in which each of said first and second passageway comprises a horizontal aperture extending from an end of said rectangular chamber, each communicating with an apex of one of said conical recesses.

5. A compressed air cleaning and drying system, according to claim 1, in which said by-pass port comprises a small aperture extending between opposite side faces of said rectangular valve member.

6. A compressed air cleaning and drying system, according to claim 1, in which said rectangular valve member has a first side face oriented towards said first passageway and a second side face oriented towards said second passageway, and an O-ring seal disposed in each of said first side face and said second side face, each said O-ring seal adapted to abut against an end wall of said rectangular chamber, a first of said O-ring seals adapted to close and seal said first passageway from said outlet port when said second passageway is open to said outlet port, a second of said O-ring seals adapted to close and seal said second passageway from said outlet port when said first passageway is open to said outlet port.

7. A compressed air cleaning and drying system, according to claim 6, in which a conical recess is provided in each of said first side face and said second side face centrally disposed within to each of said O-ring seals, and said small aperture interconnects said conical recesses at apexes thereof.

8. A compressed air cleaning and drying system, according to claim 1, in which said rectangular valve member is provided with at least one slot adapted to permit the flow of compressed air from both said passageways to said outlet port when said rectangular valve member is centered within said rectangular chamber.

9. A compressed air cleaning and drying system, according to claim 1, in which said rectangular chamber is formed by providing a rectangular channel within an upper surface of said rectangular body member and attaching a cover plate thereover to close said rectangular channel and form said rectangular chamber.

* * * * *